Jan. 7, 1958 N. L. PFEIFFER 2,818,915
RESERVE FUEL SUPPLY FOR VEHICLES
Filed July 25 1955
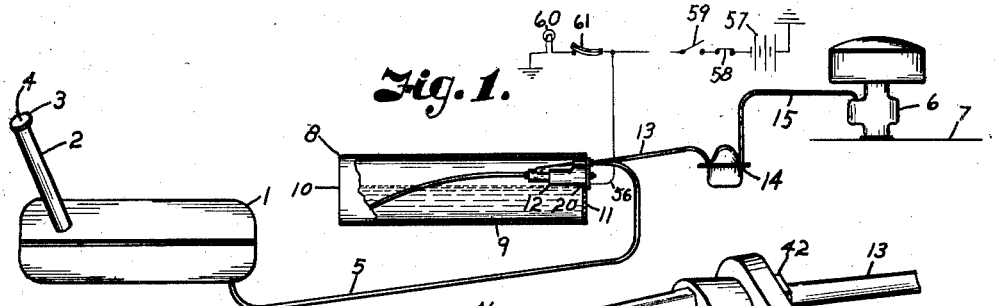
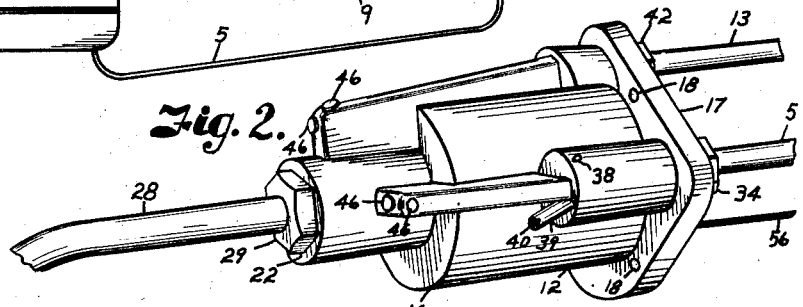
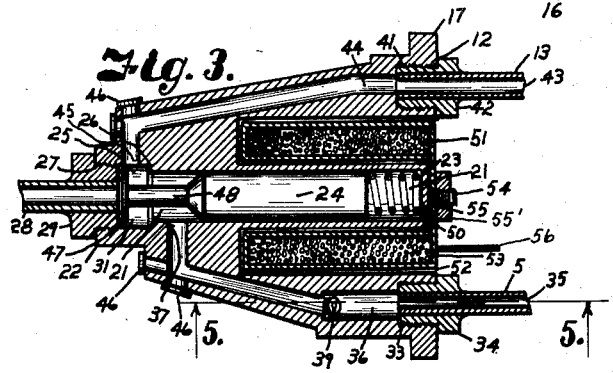
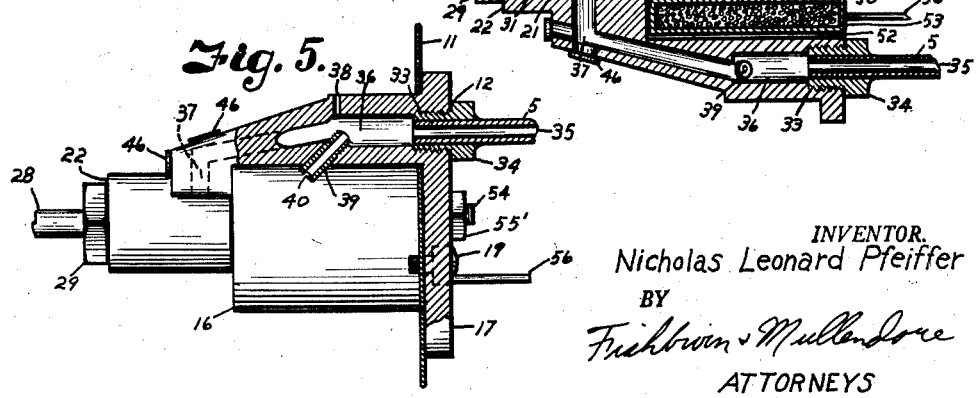
INVENTOR.
Nicholas Leonard Pfeiffer
BY
ATTORNEYS United States Patent Office 2,818,915
Patented Jan. 7, 1958

2,818,915
RESERVE FUEL SUPPLY FOR VEHICLES
Nicholas Leonard Pfeiffer, Merriam, Kans.
Application July 25, 1955, Serial No. 524,098
1 Claim. (Cl. 158—46.5)

This invention relates to new and useful improvements in fuel supply systems for motor vehicles and has for its principal object to provide an auxiliary fuel tank and control therefor, which may be conveniently connected in the fuel feeding system of a motor vehicle and which will be automatically filled and maintained in full condition during normal operations of the motor vehicle.

Other objects of the present invention are to provide an auxiliary fuel tank and control valve structure connected to the fuel feeding system whereby fuel from the main tank is drawn through a passage having openings in communication with the upper portion of the interior of the auxiliary tank for a bleeding of vapors therefrom and maintain the auxiliary tank substantially full during normal operations; to provide such reserve fuel supply in which the reserve fuel tank is always vented to the main fuel tank to eliminate any difficulties due to expansion and contraction of the fuel therein; to provide a control valve in such a reserve fuel supply with actuating means operable by the driver from the driver's seat; and to provide a reserve fuel supply which may be installed in a convenient location and connected between the main fuel tank and fuel pump of the fuel supply system to form a positive automatic filling of the fuel reserve which may be easily and conveniently delivered to the fuel pump after a normal supply of fuel in the main fuel tank has become exhausted.

In accomplishing these and other objects of the present invention, I have provided improved details of structure, the preferred form of which is illustrated in the accompanying drawings, wherein:

Fig. 1 is a schematic view showing portions of the fuel supply systems in section and in elevation wherein the fuel reserve is between the main fuel tank and fuel pump.

Fig. 2 is the enlarged perspective view of the fuel flow control valve.

Fig. 3 is a substantially horizontal sectional view through the control valve with a valve member in position for normal flow of fuel from the main tank to the fuel pump.

Fig. 4 is a sectional view similar to Fig. 3 with a valve member in position for flow of fuel from the auxiliary tank to the fuel pump.

Fig. 5 is a vertical sectional view through the control valve on the line 5—5, Fig. 3.

Referring more in detail to the drawings:

1 designates a main fuel tank of a vehicle such as an automobile or the like having the usual filler neck 2 equipped with removable cap 3 having the usual vent opening 4. The main fuel tank 1 has a fuel line 5 communicating with the bottom interior thereof for flow of fuel through the carburetor 6 of an engine 7 as later described.

The invention resides in the provision of a reserve fuel supply which includes an auxiliary tank 8 of substantially smaller capacity than the main fuel tank; for example, the main fuel tank may hold 20 gallons of gasoline and the auxiliary tank 8 have a capacity of 1 gallon. The auxiliary tank 8 may be of any desired shape and may be disposed at any convenient location and elevation relative to the main fuel tank. In the structure illustrated, the auxiliary tank 8 is shown of elongated form with sidewalls 9 and end walls 10 and 11. The control valve 12 is suitably mounted on the auxiliary tank 8 adjacent to the upper portion thereof and is connected to the fuel line 5 whereby fuel may flow from the main tank 1 through the fuel line 5 to the valve 12. The valve 12 is also connected by a fuel flow line 13 to the fuel pump 14 which delivers fuel through a line 15 to the carburetor 6 of the vehicle engine.

The control valve 12 includes a body member 16 having a flange 17 at one end thereof, provided with apertures 18 for suitable fastening devices 19 for securing the flange to a wall of the auxiliary tank 8 whereby substantially the entire body 16 of the control valve extends through an aperture 20 into the interior of the auxiliary tank 8. The valve body 16 is provided with a substantially central bore 21 extending therein from the end 22 opposite the flange 17, said bore having a closed end 23 adjacent to flanged end of the valve body. The valve body is preferably of non-magnetic metal and the bore 21 is preferably cylindrical to slidably mount a plunger 24 of magnetic material as later described. The body 16 has a counterbore 25 extending therein from the end 22 and terminating in a tapered shoulder or seat 26 in spaced relation from the end 22 of the body. The counterbore 25 is provided with internal threads 27 adjacent to the end 22. A tube or duct 28 has a threaded bushing 29 secured on one end thereof, adapted to be screwed into the threads 27 to secure the respective end of the tube to the valve body with the other end of the tube extending to the lower portion of the auxiliary tank 8 whereby said tube provides communication from the lowermost portion of the tank to the counterbore 25. The end 30 of the bushing extends into the counterbore 25 and terminates in spaced relation to the tapered shoulder 26 to form valve operating space or chamber 31 as later described, and lugs 32 are arranged on the end 30 of the bushing to form valve stops as later described.

The flanged end of the valve body 16 is provided with a threaded bore 33 in spaced relation to the bore 21 for receiving a bushing 34 suitably secured on the end of the fuel line 5 for connecting said fuel line to the valve body 16 whereby the passage 35 in the fuel line communicates with a passage 36 extending in the valve body from the threaded bore 33 to a port 37 which communicates with the bore 21 in spaced relation to the tapered shoulder 26. The valve body is provided with a small aperture 38 extending upwardly from the passage 36 and providing communication thereof with the interior of the auxiliary tank 8 to form an air bleed vent. The valve body also is preferably provided with a tubular member 39 suitably mounted therein and having one end extending into the passage 36 and spaced toward the inlet from the vent aperture 38 to restrict flow therebeyond with the bore of said tubular member 39 communicating with the passage 36. The other end of the tubular member 39 extends downwardly from the passage 36 exteriorly of the valve body and terminates in an orifice 40 communicating with the interior of the auxiliary tank 8 to provide a fuel diverter metering jet as later described.

The valve body 16 is provided with a threaded bore 41 in spaced relation to the bore 21 and threaded bore 33 and arranged at the flanged end of the body for receiving a bushing 42 suitably secured on the end of the fuel line 13 whereby the passage 43 therein communicates the intake of the fuel pump 14 with a passage 44 in the valve body extending from the threaded bore 41 to a port 45 communicating with the valve chamber 31. For convenience of machining of the valve body and arrangement of the passages therein, it may be necessary that some of the holes bored for the passages must enter from the exterior of the valve body. In the illustrated structure the entry holes for drilling the portions of the passages are filled and sealed by tapered plugs 46 or the like suitably secured therein to seal the openings.

A valve member 47 is arranged in the valve chamber 31 between the lugs 32 and the tapered seat 26. The valve member is carried on a stem 48 substantially smaller in diameter than the bore 21 and the stem is connected to the plunger 24 of magnetic material slidably mounted in the bore 21 with the end of the plunger remote from the valve member spaced as at 49 from the wall 23 when the valve member 47 is engaged with the tapered seat 26. A spring 50 is arranged in the bore 21 between the end of the plunger and the wall 23 to normally urge the plunger and valve member thereon toward the lugs 32 to restrict flow through the tube 28 and open the flow from the passage 36 through the valve chamber to the passage 44. The valve member is actuated by a magnetic coil 51 arranged in a recess 52 surrounding a portion of the bore 21 containing the plunger 24. The coil 51 is contained in a shell 53 and is held in the recess 52 by means of a suitable fastening device, for example, a stud 54 on the wall 23 extending through an aperture 55 in the shell 53 and a nut 55' fitted on the stud. The coil 51 is connected by a conductor 56 to a source of electric current, for example, the automobile battery 57. The conductor 56 is preferably connected to the vehicle ignition switch 58 whereby the magnetic coil can be energized only when the ignition switch is closed. A control switch 59 is arranged in the conductor 56 and a signal light 60 together with a make and break mechanism 61 is connected to the conductor 56 between the switch 59 and the magnetic coil to provide a signal advising when the magnetic coil is energized.

In operating apparatus assembled and connected as described, fuel is placed in the main tank 1 and with the switch 59 open, the ignition switch 58 is closed and the engine started. During such normal operation the spring 50 urges the plunger 24 to hold the valve member 47 in engagement with the lugs 32 as illustrated in Fig. 3. During operation of the engine, the fuel pump 14 applies a suction to the line 13 which draws fuel from the main tank 1 through the fuel line 5 to the passage 36, port 37, bore 21, valve chamber 31, port 45 and passage 44 to the line 13. In normal operation the fuel pump is capable of drawing more fuel than is required by the engine, therefore a metered portion of said fuel is diverted through the metering diverter jet 40 into the auxiliary fuel tank 8, which in turn, through displacement, causes air and/or vapors in the auxiliary tank to bleed through the aperture 38 into the passage 36 and flow with said fuel through the fuel pump and to the carburetor where it is vented from the fuel system. This operation continues until the auxiliary fuel tank is filled. Then continued operation of the engine will allow some of the fuel to pass through the jet 40 into the auxiliary fuel tank and an equal amount will be drawn through the tube 28 around the valve member 47 due to the spacing caused by the lugs 32 into the valve chamber and on to the fuel pump. This movement is slight; however, it is sufficient to maintain some agitation or aeration of the fuel in the auxiliary fuel tank. Also, change in pressure, due to expansion and contraction in the auxiliary fuel tank, will not cause any excess pressure on the intake of the fuel pump as the auxiliary fuel tank is vented at all times through the vent 38 to the fuel line 5 and main tank 1.

When the fuel in the main tank is exhausted, and the engine 7 begin to slow down, the operator actuates the switch 59 to energize the magnetic coil 51 causing the plunger 24 to be moved toward the wall 23, moving the valve member 47 into seating engagement with the tapered seat 26. Then the suction of the fuel pump draws fuel through the tube 28 into the valve chamber 31 and through the passage 44 to the fuel line 13. Air is drawn from the main tank through the fuel line 5 and vent 38 to replace the fuel drawn from the auxiliary fuel tank. This operation is continued until the vehicle can be taken to a place to replenish the fuel in the main tank. Then the switch 59 is actuated to break the circuit to the magnetic coil 51, the main fuel tank 1 is filled and the vehicle is ready for normal operation.

It is believed obvious I have provided a reserve fuel system for motor vehicles that is economical to manufacture, efficient in operation and capable of long, trouble-free operation.

I claim:

A reserve fuel supply for use in an automotive vehicle having a main fuel tank with a filler neck and a removable cap thereon with a vent in said cap and a fuel pump for drawing fuel through a fuel line and delivering such fuel into a carburetor of an engine comprising, an auxiliary fuel tank for positioning in spaced relation to the main fuel tank, said auxiliary fuel tank having an opening in the upper portion thereof, a valve body of non-magnetic material fixed to the auxiliary fuel tank in closing relation to the opening therein with a portion of said valve body extending into the auxiliary fuel tank, said valve body having a valve chamber therein, a passage in the valve body having one end communicating with the valve chamber and adapted for connection with a fuel line from the main fuel tank for receiving fuel from said main fuel tank, a duct communicating with the valve chamber and extending to a point at the lower portion of the auxiliary fuel tank, a second passage in the valve body communicating with the valve chamber between the duct and first-named passage and adapted for connection with a flow line leading to the fuel pump, an upwardly extending vent communicating the first-named passage with the upper portion of the interior of the auxiliary fuel tank, an orifice member positioned with its upper end in the first-named passage partially restricting flow therethrough, said orifice member being spaced upstream from the vent and inclined downwardly at an acute angle to the direction of flow in said first-named passage and terminating in downwardly spaced relation thereto, said orifice member having a passage therein communicating with the interior of the auxiliary fuel tank therebelow, said vent and orifice member being spaced from each other and extending in opposite directions to cooperate whereby air is drawn from the interior of the auxiliary tank through the vent when a portion of the fuel flowing from the main fuel tank through the first-named passage passes through the orifice member into the auxiliary fuel tank thereby automatically filling the said auxiliary tank and thereafter effecting circulation to and from the auxiliary fuel tank aerating the fuel therein, a valve member operable in the valve chamber and arranged to normally restrict flow through the duct whereby during normal operation the fuel pump applies suction to the valve chamber drawing fuel from the main fuel tank through the first-named passage to the valve chamber and then through the second passage to the fuel line to the pump and a portion of said fuel passes through the orifice into the auxiliary fuel tank to maintain same substantially full, said valve body having an elongate bore communicating with the valve chamber, a plunger of magnetic material slidably mounted in the bore and connected with the valve member, a magnetic coil fixed on the valve body concentric with the plunger and spaced therefrom in surrounding relation thereto, and means selectively energizing the magnetic coil for activating the plunger to move the valve member and close the first-named passage thereby whereby suction from the fuel pump draws fuel from the auxiliary fuel tank through the duct, valve chamber and second passage and flow line, and removal of fuel from the auxiliary fuel tank draws air through the fuel line to the first-named passage and into the auxiliary fuel tank.

References Cited in the file of this patent

FOREIGN PATENTS

| | | |
|---|---|---|
| 712,719 | Germany | Oct. 24, 1941 |
| 1,035,612 | France | Apr. 22, 1953 |